(12) United States Patent
Glocer et al.

(10) Patent No.: US 8,439,408 B2
(45) Date of Patent: May 14, 2013

(54) PIPE CLAMP

(75) Inventors: Rodney Glocer, Somerton (AU); Russell Bruerton, Botanic Ridge (AU); Ian C. Chapman, Shepparton (AU)

(73) Assignee: Tyco Water Pty Limited, Nowra (AU)

( * ) Notice: Subject to any disclaimer, the term of this patent is extended or adjusted under 35 U.S.C. 154(b) by 333 days.

(21) Appl. No.: 12/572,199

(22) Filed: Oct. 1, 2009

(65) Prior Publication Data

US 2010/0083473 A1  Apr. 8, 2010

(51) Int. Cl.
*F16L 25/04* (2006.01)
*F16L 55/168* (2006.01)

(52) U.S. Cl.
USPC ............. 285/420; 285/15; 285/367; 24/279; 24/280

(58) Field of Classification Search ............... 285/15, 285/367, 420, 421; 24/279, 280; 138/99
See application file for complete search history.

(56) References Cited

U.S. PATENT DOCUMENTS

| | | | | |
|---|---|---|---|---|
| 2,863,203 A | * | 12/1958 | Dalpiaz | 24/279 |
| 2,980,143 A | * | 4/1961 | Harris | 138/99 |
| 3,089,212 A | * | 5/1963 | Graham et al. | 24/279 |
| 3,204,665 A | * | 9/1965 | Faint | 138/99 |
| 3,267,547 A | * | 8/1966 | Morriss, Jr. | 24/279 |
| 3,737,959 A | * | 6/1973 | Smith et al. | 24/279 |
| 3,914,833 A | * | 10/1975 | Dunmire | 24/279 |
| 4,409,708 A | * | 10/1983 | Hauffe | 24/279 |
| 4,413,388 A | * | 11/1983 | Akhtar-Khavari et al. | 24/279 |
| 4,630,647 A | * | 12/1986 | Thomson | 138/99 |
| 4,889,167 A | * | 12/1989 | Morris | 138/99 |
| 6,145,896 A | * | 11/2000 | Vitel et al. | 285/414 |
| 6,637,076 B2 | * | 10/2003 | Tran | 24/279 |
| 2004/0183294 A1 | * | 9/2004 | Elliott | 285/15 |

FOREIGN PATENT DOCUMENTS

GB       2103698 A   *   2/1983

* cited by examiner

*Primary Examiner* — James Hewitt

(57) ABSTRACT

A pipe repair clamp includes a flexible strap having ends that are brought together when the clamp is closed. A thrust plate is secured near the first end of the flexible strap. A lug is secured to the thrust plate. A lug plate is secured near the second end of the strap. A threaded stud is secured to the lug plate and is used to tighten the clamp. A lug cover plate is secured to the lug and the thrust plate and receives the threaded stud. The lug cover plate includes a curved end portion covering at least a portion of the lug. A locking plate receives the threaded stud. The locking plate slides along a top surface of the lug and over the lug cover plate when the first and second ends of the strap are pulled toward each other when the clamp is tightened around a pipe.

20 Claims, 3 Drawing Sheets

PIPE CLAMP

FIELD OF THE INVENTION

Embodiments of the invention relate to the field of pipe clamps. More particularly, embodiments of the invention relate to a pipe repair clamp or tapping sleeve (otherwise known as a flange off-take) used to wrap around pipes carrying various types of process media including water.

DISCUSSION OF RELATED ART

Pipe repair clamps are used to repair a leak or crack in a process pipe. These repair clamps typically include a locking mechanism attached to a metal band. The metal band is wrapped around the pipe at the location of the crack or leak and tightened to draw the ends of the band together to form a gasket around the pipe. The tightening of the clamp is performed by a locking mechanism comprising threaded bolts or studs that are attached to one end of the band at a thrust plate and received by a bolting means at the other end of the band. A locking plate is usually employed which is forced over the thrust plate before the studs are tightened. However, a significant amount of force is required to bring the two ends of the band together and position the locking plate over the thrust plate. In addition, sometimes the locking plate falls down the bolt and gets caught in the junction between the lugs and the bolts. This is especially the case when trying to repair small diameter clamps up to approximately 250 mm in diameter because the small clamps have greater rigidity requiring more force to close the clamp and pull the locking plate into position.

Prior attempts to solve this problem have lifted the lugs slightly above the height of the thrust plate to allow the locking plate to be pulled over the thrust plate. However, this doesn't always solve the problem because the lugs have not been lifted uniformly to the same height. This causes the locking plate to catch the junction between the lugs and the thrust plate. Moreover, welding distortions causes gaps between the junction of the lug and thrust plate such that the return of the locking plate can not be pulled over the end of the thrust plate into position.

SUMMARY OF THE INVENTION

Exemplary embodiments of the present invention are directed to a pipe repair clamp. In an exemplary embodiment, the pipe repair clamp includes a flexible strap formed into a substantially cylindrical body defining a hollow bore. The strap has a first and second ends. A thrust plate is secured near the first end of the flexible strap. At least one lug is secured to the thrust plate and extends perpendicular to the thrust plate. A lug plate is secured near the second end of the strap. At least one threaded stud is secured to the lug plate and extends toward the lug. A lug cover plate is perpendicularly secured to the lug and the thrust plate. The lug cover plate includes at least one opening configured to receive the threaded stud and a curved end portion which covers at least a portion of the lug. A locking plate has an opening adapted to receive the threaded stud. The locking plate is configured to slide along the lug and over the lug cover plate when the first and second ends of the strap are pulled toward each other to close the clamp.

DESCRIPTION OF EMBODIMENTS

Figure 1:
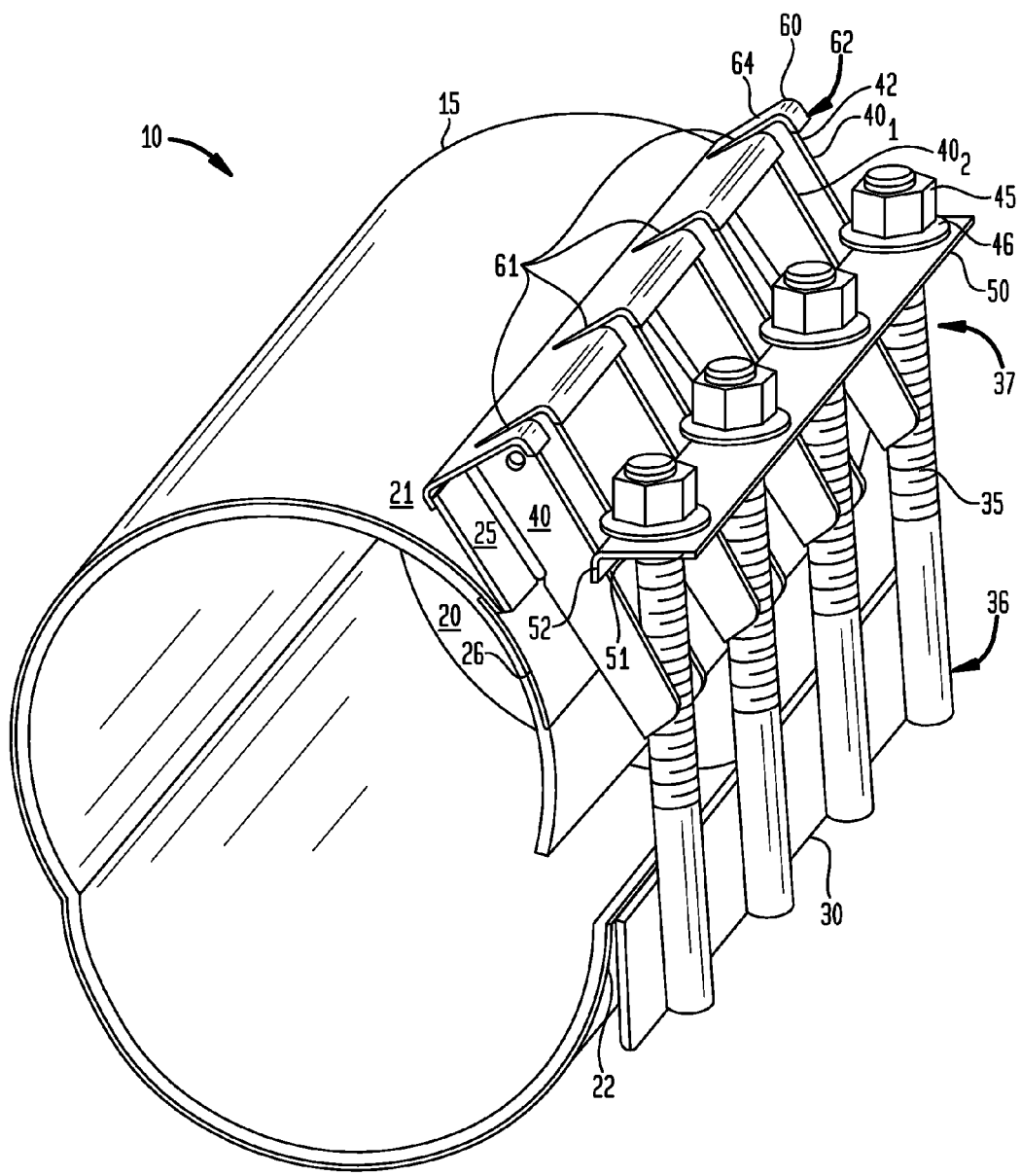
FIG. 1 is a perspective view of a pipe clamp in an open position in accordance with the present invention.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 illustrates an embodiment of clamp 10 in an open position accordance with the present invention. Clamp 10 includes a strap or band 15 having a generally circular cross-section which forms a hollow inner bore 20 in which a pipe (not shown) is positioned. Strap 15 is preferably formed of metal and, for water pipe applications, made of stainless steel. The interior surfaces of strap 15 forming hollow inner bore 20 is usually lined with a resilient material to form a gasket seal around the pipe to be repaired. A thrust plate 25 is tangentially connected to a first end 21 of strap 15 and lug plate 30 is tangentially connected to a second end 22 of strap 15. Saddle plate 26 (also shown in FIG. 3), is connected to first end 21 and extends past second end 22 to provide an overlapping configuration when clamp 10 is tightened.

A plurality of studs 35 are spaced along lug plate 30. Each stud includes a first end portion 36 which is fixedly attached to lug plate 30 and a threaded end portion 37 adapted to receive a respective one of nuts 45 and washer 46. A plurality of generally parallel lugs 40 are perpendicular to and welded to thrust plate 25 where each pair of lugs forms a channel in which a respective one of the plurality of studs 35 is positioned. For example, lugs $40_1$ and $40_2$ form a channel which receives stud 35. The width of the channel formed by a respective pair of lugs 40 is greater than the diameter of stud 35. The lugs are connected parallel to thrust plate 25 and tangential to band 15. In the open position, studs 35 are at an acute angle with respect to lugs 40.

Clamp 10 further includes a stud locking plate 50 having a longitudinally extending flat portion 51 and a curved end portion 52. A plurality of bores are spaced along the flat portion 51 to receive threaded end portions 37 of studs 35. Washer 46 contacts flat portion 51 of stud locking plate 50. A lug cover plate 60 is connected in a perpendicular relationship to thrust plate 25. Lug cover plate 60 is also perpendicularly connected to a first end 42 of each of lugs 40. Lug cover plate 60 includes a plurality of openings 61 adapted to receive respective second end portions 37 of studs 35. Lug cover plate 60 also includes two curved end portions 62 and 63 (shown in FIG. 2) and a flat landing portion 64 disposed therebetween to form a U-shaped configuration. Curved end portion 63 wraps around thrust plate 25. Lug cover plate 60 is welded to each of the first ends 42 of lugs 40.

Figure 2:
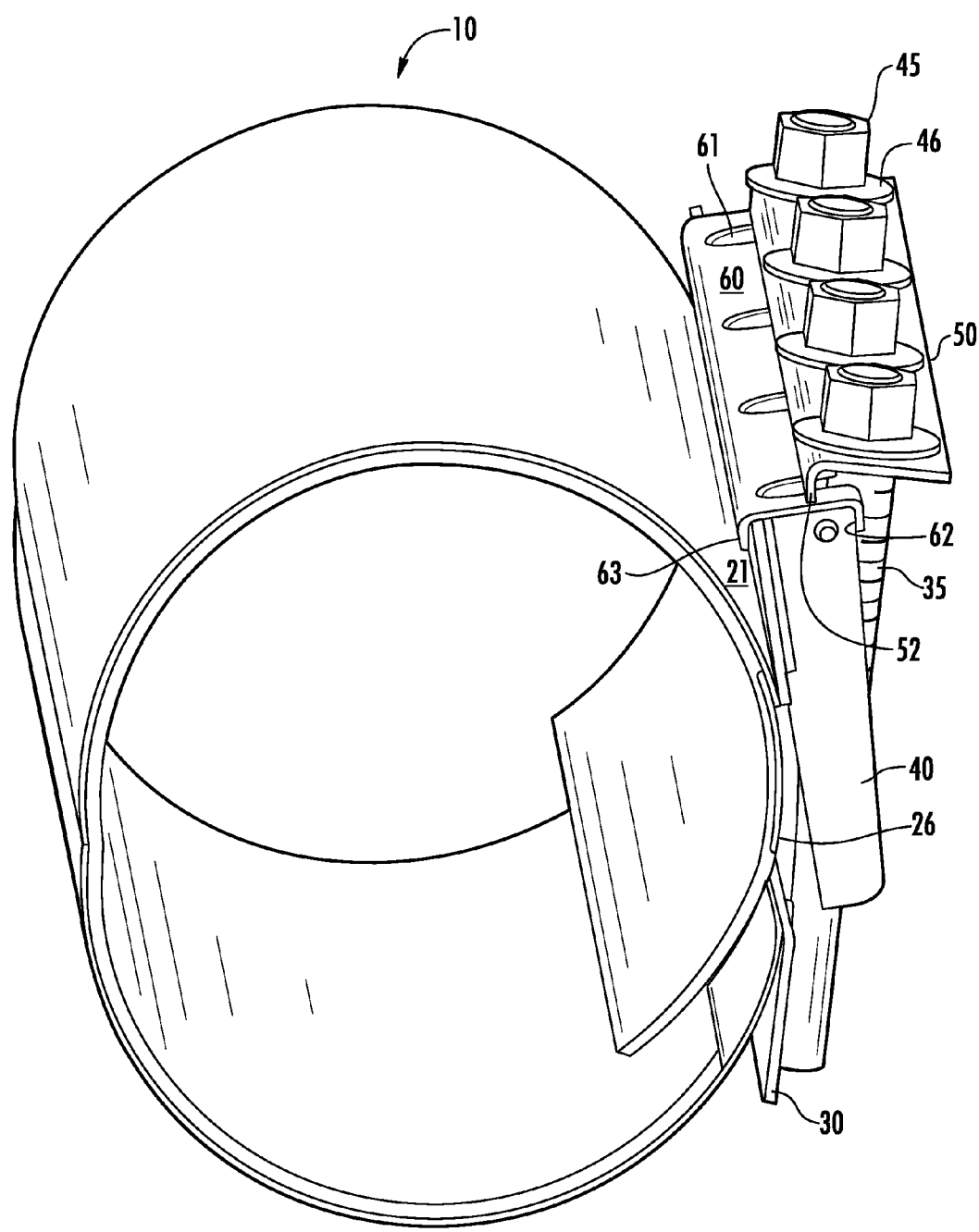
FIG. 2 is a perspective view of a pipe clamp in a partially closed position in accordance with the present invention.
Figure 3:
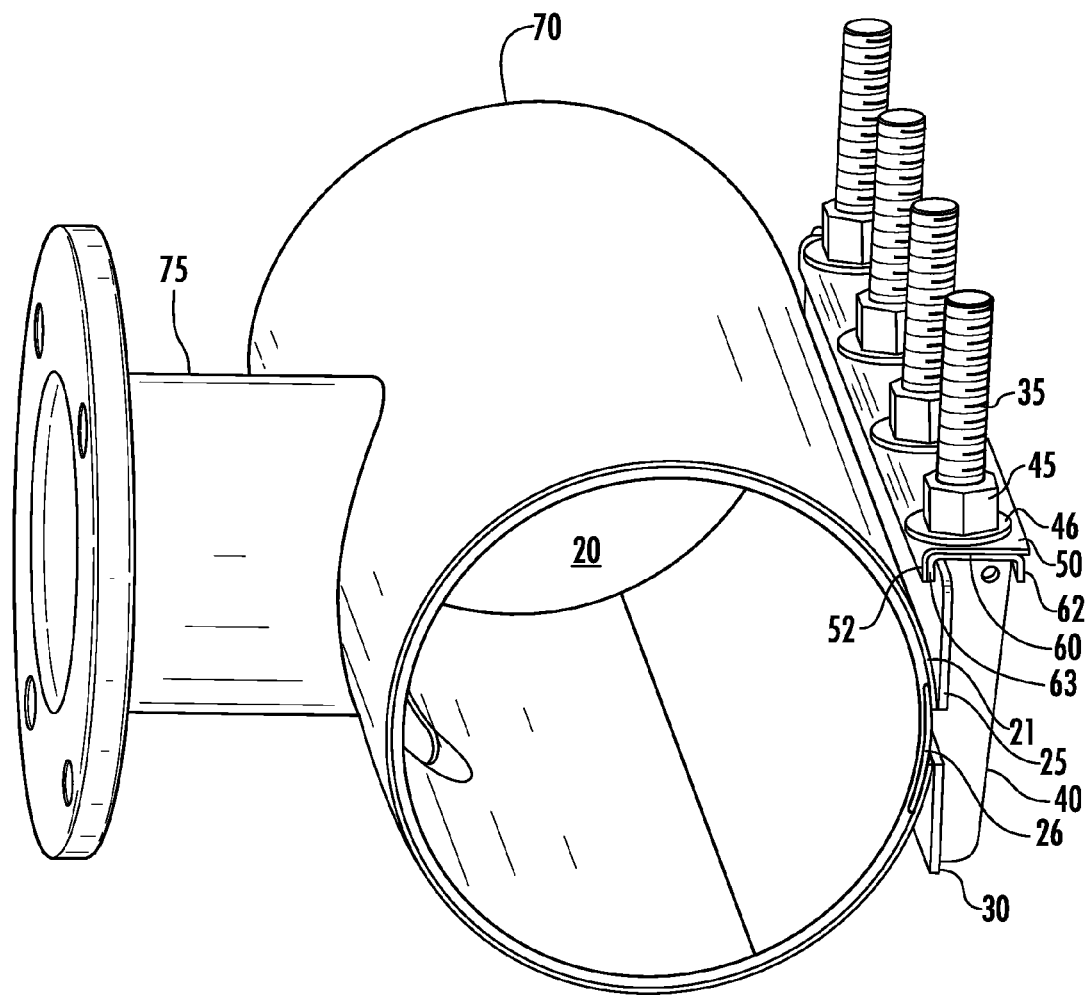
FIG. 3 is a perspective view of a pipe clamp in a closed position in accordance with the present invention.

FIG. 2 illustrates an embodiment of clamp 10 in a semi-closed position where curved section 52 of stud locking plate 50 engages at least a portion of lug cover plate 60. As end portions 21 and 22 of band 15 are forced together around a pipe, the angle between studs 35 and lugs 40 decreases and stud locking plate 50 slides along the bearing surface of curved section 62 and flat landing portion 64 of lug cover plate 60. Lug cover plate 60 forms a landing for stud locking plate 50 to be drawn onto and on top of lug cover plate 60 and into position. In this manner, stud locking plate 50 is prevented from returning down studs 35 toward lug plate 30 and/or being caught at the junction between studs 35 and lugs 40 making it difficult to lift the stud locking plate 50 up into position. As the nuts 45 are tightened down threaded studs 35, washers 46 and nuts 45 force stud locking plate 50 to slide over flat lug plate landing portion 64 until curved portion 52 of stud 35 engages curved portion 63 of lug cover plate 60. This sliding movement of stud locking plate 50 over lug cover plate 60 aids the assembly process making it easier to tighten stud locking plate 50 down and pull together the ends 21, 22 of clamp 10 to a closed position as illustrated in FIG. 3. In addition, when clamp 10 is used to repair small diameter pipes, only a single clamping mechanism may be used on band 15. A significant amount of physical force is required to close clamp 10. Lug cover plate 60 provides a landing for locking plate 50 to slide up over lugs 40 and close clamp 10 with less required force.

FIG. 3 illustrates a tapping sleeve (otherwise known as a flange off-take) clamp 70 in a closed position having a branch portion 75 in accordance with the invention. This configuration may also be used with a standard repair clamp as described above. Again, as nuts 45 are tightened onto studs, the ends 21 and 22 of band 15 collapse to surround the pipe. In the closed position, locking plate 50 is on top of lug cover plate 60 and curved portion 52 wraps around curved portion 63. In addition, curved portion 63 wraps around thrust plate 25. Studs 35 sit in the channels formed by lugs 40 through openings 61 and are substantially parallel to thrust plate 25. By utilizing lug cover plate 60 having a curved portion 62, locking plate 50 slides along lugs 40 and over lug cover plate 60 to allow tightening of the clamp or tapping sleeve over a pipe. Tapping sleeve 70 is usually longer as compared with a standard pipe repair clamp. In addition, branch pipe 75, which is welded to clamp 70 stiffens the entire clamp making it difficult to position clamp 70 around a pipe to be tapped. In particular, this stiffness makes it more difficult to pull the ends 21 and 22 of the clamp together to effectuate a seal. By providing lug cover plate 60 welded to lugs 40, less force is needed to pull ends 21 and 22 together since locking plate 50 slides over lug cover plate 60.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof

What is claimed is:

1. A pipe repair clamp comprising:
a flexible strap formed into a substantially cylindrical body defining a hollow bore, said strap having first and second ends;
a thrust plate secured to and near said first end of said flexible strap;
at least one lug secured to said thrust plate and extending, perpendicular to said thrust plate;
a lug plate secured to and near said second end of said strap;
at least one threaded stud secured to said lug plate and extending toward said lug;
a lug cover plate perpendicularly secured to said at least one lug and said thrust plate, said lug cover plate having at least one opening configured to receive said at least one threaded stud and a curved end portion covering at least a portion of said at least one lug; and
a locking plate having at least one opening adapted to receive said at least one threaded stud, said locking plate configured to slide along said at least one lug and over said lug cover plate when said first and second ends of said strap are pulled toward each other to close said clamp.

2. The pipe repair clamp of claim 1 further wherein said thrust plate is tangentially positioned with respect to said cylindrical body.

3. The pipe repair clamp of claim 1 further wherein said lug plate is tangentially positioned with respect to said cylindrical body.

4. The pipe repair clamp of claim 1 wherein said at least one lug is a first lug, said clamp further comprising a second lug secured to said thrust plate and extending parallel to said first lug, said first and second lugs defining a channel through which said threaded stud is positioned.

5. The pipe repair clamp of claim 1 further comprising a fastening nut positioned on said threaded stud to tighten said clamp.

6. The pipe repair clamp of claim 5 further comprising a washer positioned between said fastening nut and said locking plate around said opening and around at least a portion of said threaded stud.

7. The pipe repair clamp of claim 1 wherein said hollow bore is lined with a resilient material to form a gasket around a pipe.

8. The pipe repair clamp of claim 1 wherein said lug cover plate further comprises a flat portion disposed between said curved end portion and a second curved end portion, said second curved end portion adapted to extend over said thrust plate.

9. A pipe repair clamp comprising:
a strap having first and second ends and defining a bore;
a thrust plate secured to the first end of the flexible strap, and a lug plate secured to the second end of the strap;
a lug secured to the thrust plate and extending perpendicular to the thrust plate;
at least one threaded stud secured to the lug plate and extending toward the lug;
a lug cover plate secured to the lug and to the thrust plate, the lug cover plate further having a flat landing portion and first and second end portions forming a U-shaped configuration, the flat landing portion having an opening adapted to receive the stud; and
a locking plate having an opening, adapted to receive the stud, the locking plate configured to slide over the lug cover plate when the first and second ends of said strap are pulled toward each other to configure the clamp into a closed position.

10. The pipe repair clamp of claim 9, wherein the lug is a first lug, the clamp further comprising a second lug secured to the thrust plate, the first and second lugs defining a channel through which the stud is positionable.

11. The pipe repair clamp of claim 9, wherein the locking plate has a curved portion adapted to extend over the lug cover plate when the clamp is in the closed position.

12. The pipe repair clamp of claim 11, wherein the curved portion of the locking plate extends over the first end portion of the lug cover plate when the clamp is in the closed position.

13. The pipe repair clamp of claim 9, wherein the opening of the flat landing portion of the lug cover plate is adapted to align with the opening in the locking plate when the clamp is in the closed position.

14. The pipe repair clamp of claim 9, wherein the opening in the flat landing portion opens through the second end portion of the lug cover plate.

15. A pipe repair clamp comprising:
- a strap having first and second ends, the strap defining a bore;
- a thrust plate secured to the first end of the flexible strap, and a lug plate secured to the second end of the strap;
- a lug secured to the thrust plate;
- at least one threaded stud secured to the lug plate and extending toward the lug;
- a lug cover plate secured to the lug and to the thrust plate, the lug cover plate having a flat landing portion and an end portion wrapping around a portion of the thrust plate, the flat landing portion having an opening adapted to receive the stud; and
- a locking plate having an opening adapted to receive the stud, the locking plate configured to slide over the lug cover plate when the first and second ends of the strap are pulled toward each other to configure the clamp into a closed position.

16. The pipe repair clamp of claim 15, wherein the lug is a first lug, the clamp further comprising a second lug secured to the thrust plate, the first and second lugs defining a channel through which the stud is positionable.

17. The pipe repair clamp of claim 15, wherein the locking plate has an end portion adapted to extend over the end portion of the lug cover plate when the clamp is in the closed position.

18. The pipe repair clamp of claim 17 wherein the locking plate end portion is curved.

19. The pipe repair clamp of claim 15, wherein the opening of the flat landing portion of the lug cover plate is adapted to align with the opening in the locking plate when the clamp is in the closed position.

20. The pipe repair clamp of claim 15, wherein the opening in the flat landing portion opens through a second end portion of the lug cover plate.

* * * * *